July 10, 1934.     B. J. HASKINS     1,966,066
DISTRIBUTOR TESTER
Filed March 9, 1933     3 Sheets-Sheet 1

Inventor:
Butler J. Haskins,
By Banning & Banning
Attys.

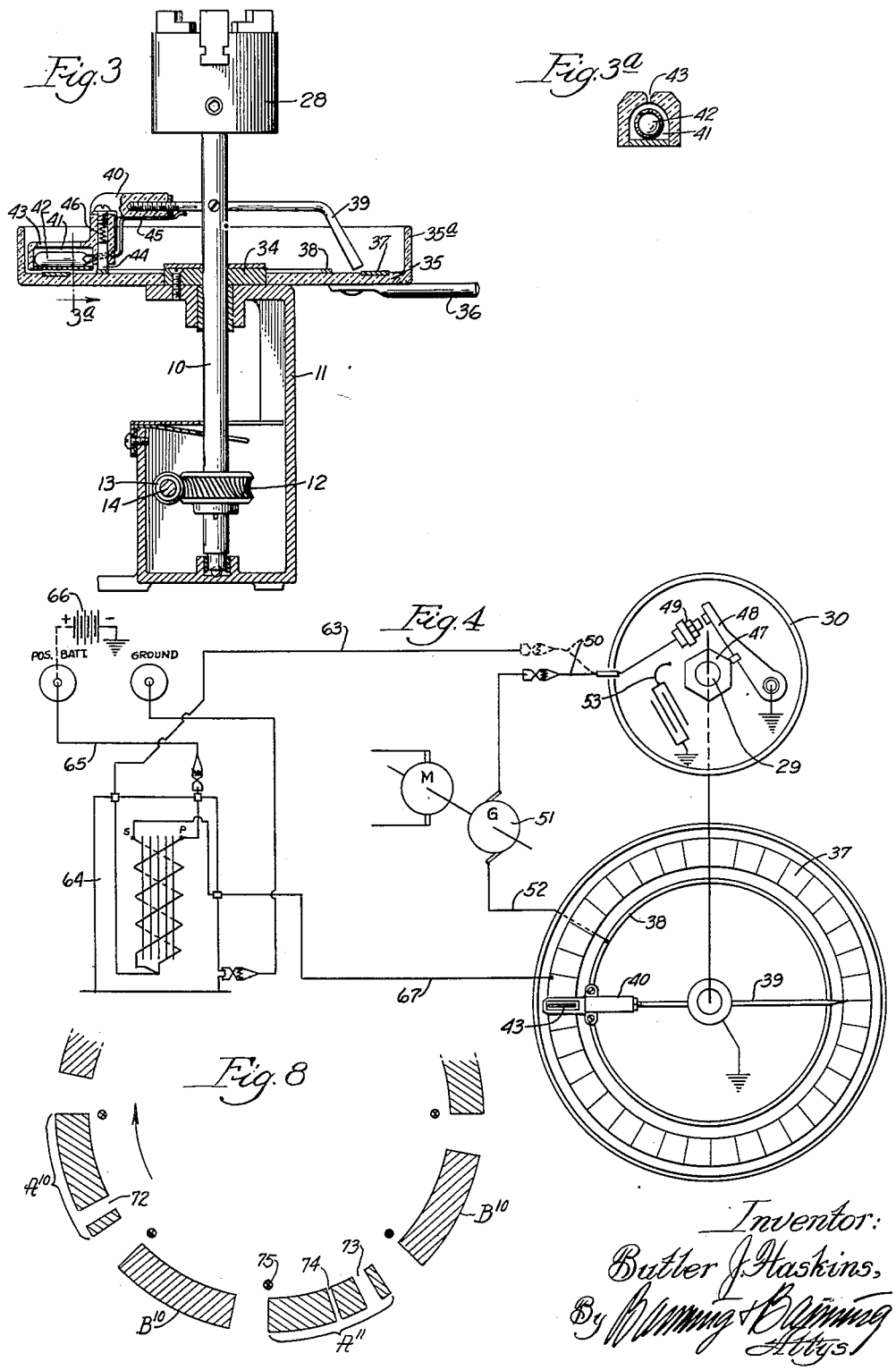

Inventor:
Butler J. Haskins,
By Banning & Banning
Attys.

Patented July 10, 1934

1,966,066

UNITED STATES PATENT OFFICE 1,966,066

DISTRIBUTOR TESTER

Butler J. Haskins, Chicago, Ill., assignor to Joseph Weidenhoff, Inc., Chicago, Ill., a corporation of Illinois Application March 9, 1933, Serial No. 660,157

18 Claims. (Cl. 177—311)

This invention relates to apparatus for testing and setting automobile engine distributors, and is an improvement on my Reissue Patent No. 18,596.

The embodiment illustrated is particularly adapted to be used for determining and setting the angle of contact for distributors having two contact arms. The methods heretofore used for setting the angle of contact on the cam have been wholly inadequate and have resulted in very imperfect settings. If the setting is 5° off normal in one breaker of a double breaker distributor, the difference between the two sets is double this, or 10°, and as this angle is doubled for the crank shaft, the error here is 20°.

An object of this invention is to provide apparatus for giving a visual indication of the angle of contact of each closing of the points of the breaker mechanism of the distributor while the distributor is in operation.

Another object is to provide such a piece of testing apparatus which will permit the distributor under test to be adjusted while in operation and under such observation.

Another object is to provide such a testing device which can be readily moved to a position adjacent an automobile and placed in position to test the distributor in connection with the other elements of engine ignition system, particularly the engine battery, spark coil, etc., so that the test may be made under conditions simulating those existing in the distributor during normal operation.

Still another object is to provide such apparatus which is so simple that it can be used by an inexperienced operator to make settings of the contact angle which are accurate to a degree heretofore seldom attained by the most expert operators.

These and other objects, as will hereinafter appear, are accomplished by this invention which is fully described in the following specification and shown in the accompanying drawings, in which—

Figure 2:
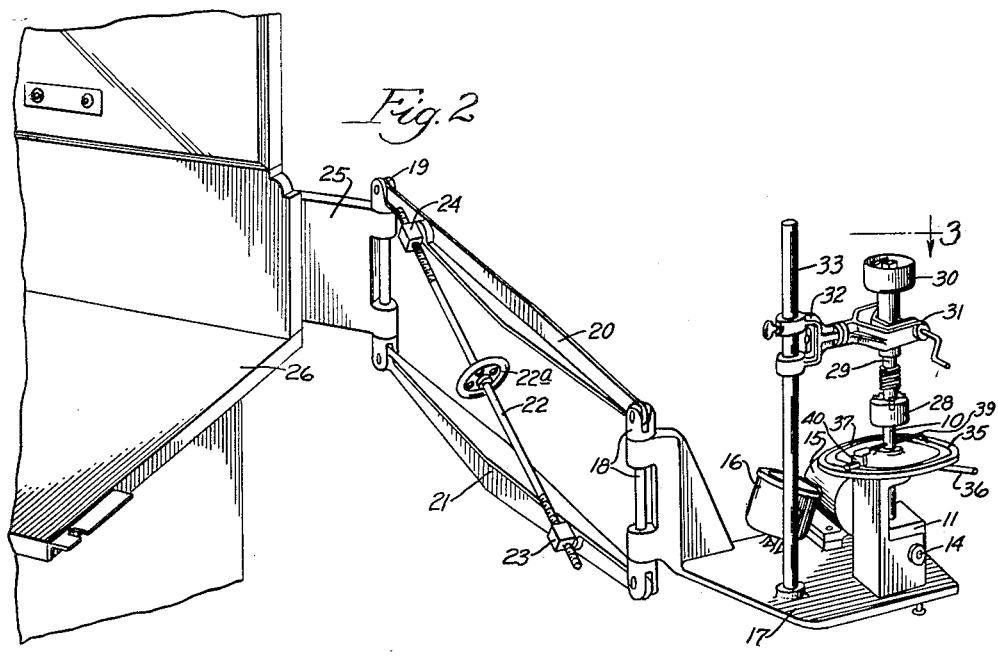
Fig. 2 is an enlarged partial perspective view of the same.
Figure 5:
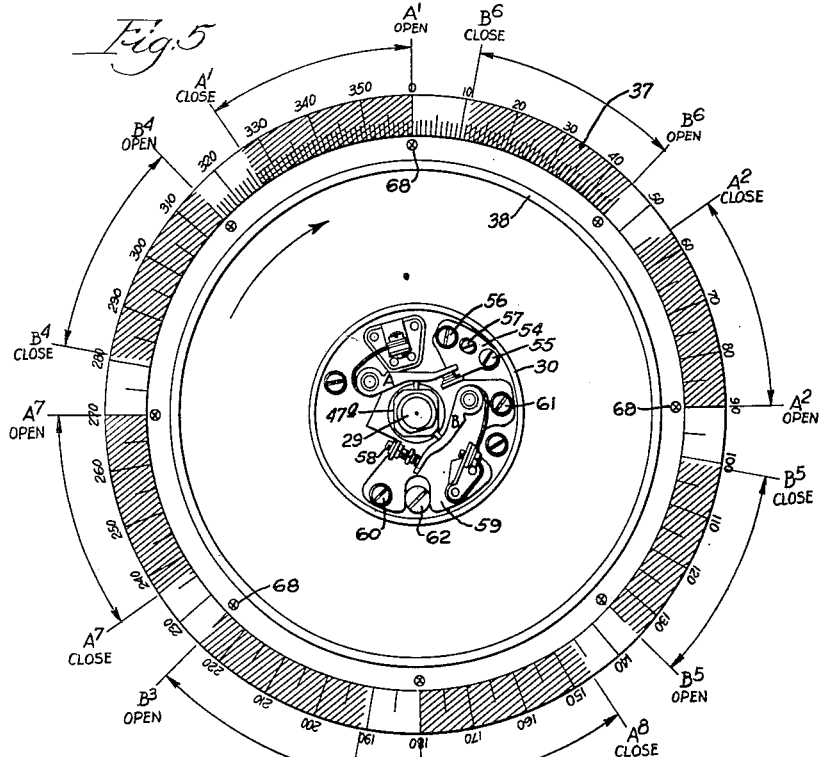
Figure 6:
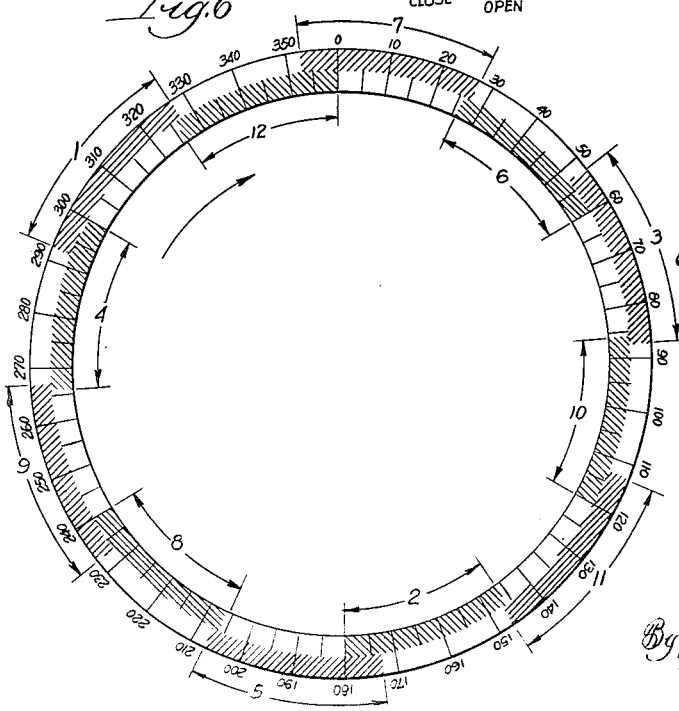
Figure 7:
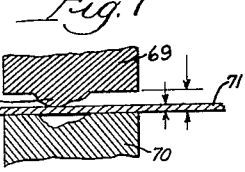

Fig. 3 is an enlarged vertical section on the line 3 of Fig. 2;

Fig. 3ª is an enlarged section on the line 3ª of Fig. 3;

Fig. 4 is a diagram of the connections;

Fig. 5 is a top plan view of the distributor showing the breaker points of the double breaker type and the graduated dial showing the angles of contact made by the breaker points in an eight cylinder engine distributor;

Fig. 6 is a similar graduated chart for a twelve cylinder engine distributor having a double breaker and a six lobe cam;

Fig. 7 is a greatly enlarged sectional view of two breaker points showing a conventional method of setting the points and illustrating an error which may be caused thereby; and Fig. 8 is a half circle of flashes showing one set normal, the other abnormal due to bouncing.

Figure 1:
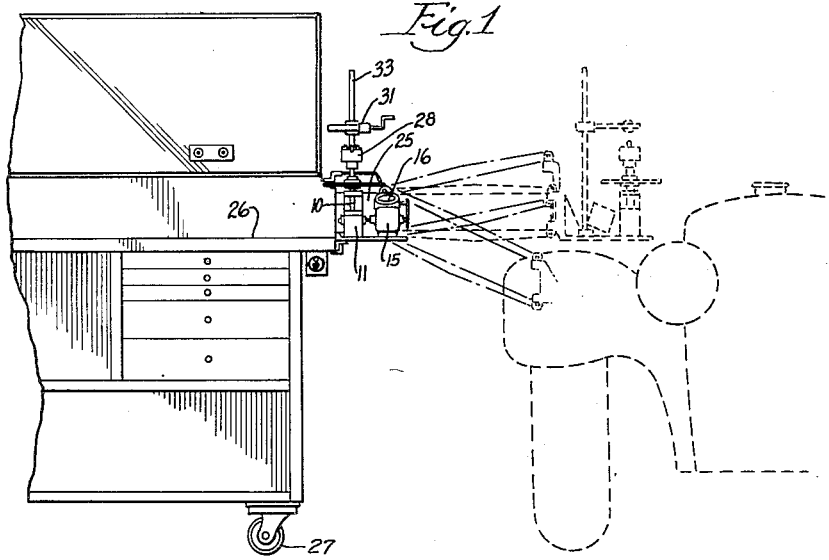
Figure 1 is a partial front elevation of a testing bench having the ignition tester hingedly secured thereto, and shown in various dotted line positions of adjustment with respect to an automobile whose distributor is to be tested.

The ignition tester, as shown in Figs. 1, 2 and 3, comprises a shaft 10 mounted in suitable bearings in a housing 11, the shaft carrying a worm wheel 12 which meshes with a worm 13 on a shaft 14, which is driven by a motor 15 which receives electric current from any suitable source. The speed of this motor may be regulated in any well known manner, and a tachometer 16 is placed adjacent the motor so as to be readily read by the operator.

This mechanism is mounted upon a bracket 17 which is hingedly mounted upon a vertical member 18, the two ends of which are connected to a similar member 19 by means of parallel links 20, 21. An adjusting rod 22 is threaded at its two ends into nuts 23, 24, which in turn are pivotally connected to opposite ends of the links 20, 21. By turning the rod 22 by means of the hand wheel 22ª, the distance between the nuts 23, 24 is increased or decreased, with the result that the vertical member 18 is lowered or raised, thereby lowering or raising the testing mechanism mounted on the bracket 17.

The vertical member 19 is pivotally connected to a hinge plate 25 which is secured to the back of a bench 26 which is preferably mounted on casters or the like 27, so that it may be readily rolled from one part of the building to another. Thus it will be seen that the ignition testing mechanism may be carried to the automobile to be tested, as shown in Fig. 1, and that having removed the distributor from the automobile it may be placed in the testing mechanism which for convenience of operation may then be raised or lowered to the desired height, as shown in dotted lines. For the purpose of this test, which will later be described, much of the parts of the engine ignition are used so as to make the test conform to the ordinary operation of the ignition mechanism as nearly as possible. If desired, the ignition testing mechanism may be hingedly connected to a post or wall, so that the automobile can be driven up to it instead of having it wheeled to the automobile.

Referring to Fig. 2, the shaft 10 carries a chuck 28 at its upper end which is adapted to grasp the lower end of a shaft 29 of a distributor 30, the body of which is held by means of a clamp 31 which is carried by a bearing 32 adjustably mounted upon a vertical rod 33 carried by the bracket 17. Thus the distributor shaft is held in alignment with the shaft 10 and driven thereby so that the distributor functions substantially as when in operation on the engine at the same speed.

The housing 11 (Fig. 3) carries a circular block 34 which is secured concentrically with the shaft 10, and provides a bearing about which a disk 35 may rotate. The disk is preferably provided with a handle 36 for moving it back and forth, as will later be explained. This disk is preferably made of insulating material, such as a phenolic condensation product, and carries an annular metal scale 37 which is secured to its upper surface. It also carries a collector ring 38. The shaft 10 carries a metal finger 39 which terminates adjacent the scale 37, but is spaced therefrom. The opposite end of the finger 39 carries an insulating body 40 which extends down so as to closely overlie the scale 37. This body has a chamber 41 in which is located a neon tube 42, the light of the neon tube being visible only through a narrow slot 43 in the top of the chamber. This tube is electrically connected at one side through a suitable brush 44 with the ring 38, while the opposite side of the tube connects through a lead 45 with the finger 39. The brush 44 is shown pressed against the ring 38 by means of a spring 46. The disk has an annular rim 35ᵃ which forms a dark well in which the neon tube rotates, the flashes thereby being more clearly seen.

Referring now to Fig. 4, it will be seen how the apparatus of Fig. 3 is connected into the ignition circuit. The simplest form of distributor is here shown in this figure, namely, one having a single breaker. The distributor shaft 29 here carries a six lobe cam 47 which operates a single breaker arm 48, which is here shown held away from the adjustable breaker point 49. The breaker arm is connected to ground, while the adjustable contact 49 is connected through a lead 50 (in full line) to a suitable source of current 51, such as a generator capable of delivering 90 to 100 volts of direct current for continuously energizing the neon tube. An alternating or pulsating current may be used if of high enough frequency. This generator connects through a lead 52 to the collector ring 38.

Thus it will be seen that with the shafts 10, 29 in operation and the parts connected, as has just been described, on closing the breaker 48, 49 current will flow from the generator through the ring 38, to the neon tube, to finger 39, to ground, thence through the breaker arm 48 to contact 49, and back to the generator. This voltage will be sufficient to cause the neon tube to glow brightly and continuously, and an operator standing over the dial and looking down at it will see a continuous bright streak while the contact arm 48 is in engagement with the contact 49. For this purpose it is essential that the lead 53 to the distributor condenser which normally is connected to the contact 49 be broken; otherwise the neon tube will continue to glow due to surges into and out of the condenser, and with the device in operation the points of opening and closing the breaker would not be sharply marked. With this condenser disconnected in this way, however, the making and breaking of the contacts will be very sharply indicated by the glow of the neon tube.

Thus the operator looking down upon the dial may shift the scale by means of the handle 36 so as to bring one of the bright bands thus produced over the scale at a point where it will have its beginning at a definite point on the scale. such as zero. The interpretation of these readings will be discussed later, as will also the mechanism shown in Fig. 4 for testing the spark after the breaker points have been set.

Figure 5 shows a distributor having double breaker points which fire alternately. This shows a simple form of distributor for an eight cylinder engine having a four lobe cam. This shows a distributor shaft journaled in a distributor body 30, and having a four lobe cam 47ᵃ. Two breaker arms A and B are here shown, each breaker arm being grounded as shown in Fig. 4. The stationary contact engageable by the arm A is carried on a plate 54 which is pivotally mounted on a screw 55, and normally locked by means of a screw 56. To set the breaker A the screws 55 and 56 are loosened and the tester set in motion. By moving the eccentric screw 57, the plate 54 is moved back and forth, thereby increasing or decreasing the angle of contact between the arm A and the stationary distributor point. While this is being done the actual length of this angle of contact may readily be measured on the scale 37. In the eight cylinder engine, whose diagram is shown in Fig. 5, the desired angle of contact is taken at 34°, and since the sparks in this engine are uniformly distributed, that is 45° apart, as measured on the distributor shaft, the angular distance between contacts is 11°; that is, the difference between 34° and 45°.

The shaded portions indicate the appearance and position of the neon flashes. Alternate shaded portions are marked A indicating they are produced by closing the breaker arm A. The intervening strips are marked B for distributor B. The numerals following these letters on the light bands or strips refer to the cylinder numbers, and show the firing order. The direction of rotation of the distributor shaft is clockwise, as shown by the arrow. The beginning of the band therefore corresponds to the closing of the points marked "Close" on Fig. 5, and the opening of the points at which point the spark occurs is marked "Open".

A little practice will show that a very slight movement of the screw 57 increases or decreases the length of the angle of contact very greatly, so that several adjustments may be necessary before the operator hits the desired setting. In the meantime, by moving the scale he is able to bring one of the bands of light under adjustment to the desired length on the scale, after he tightens screws 55 and 56. When this is done he again reads the length of the angle of contact on the scale to make certain that in tightening these, the angle of contact has not been changed. If desired, during the setting of one of the breaker arms the other breaker arm may be thrown out of commission temporarily by putting a piece of wood or other insulating material under the other breaker arm and between it and its contact. By doing this, each alternate bright band will be omitted.

Having set one of the arms as A, the other arm is then adjusted for its angle of contact. In the one here shown, the other arm is adjusted in a somewhat different manner. The fixed contact 58 is a screw contact which is grounded so as to adjusted it to give the desired angle of contact which is read on the scale as before. For certain types of distributors, such as the one shown in Fig. 5, one of these two breaker arms is then adjustable with respect to the other. The breaker arm B together with its contact are mounted upon a plate 59 which is journaled about the shaft 29, whereas the breaker arm A is mounted directly upon the distributor body 30. The plate 59 is secured by means of screws 60 and 61 to the distributor body. These are loosened and an eccentric screw 62 serves to move this plate back and forth to provide the necessary adjustment.

Thus if the contact angle for each of the breaker arms had previously been set at 34° but on comparing the two contact angles on the dial which is done by rendering both of them visible at the same time it was found that the angle between the bands was 8° in certain instances and 14° in the alternate spaces, the observer knowing that the proper interval is 11° would adjust the plate 59 until there was an interval of 11° between each of the bands. When this was done he would set the screws 60 and 61 and again read the angles of contact on the scale to make certain that they were still correct. As a final check on the setting, he would then proceed to read on the scale the points at which the sparks actually appear. The mechanism for doing this will now be described.

Referring to Fig. 4, the tester is now disconnected from the generator 51 and the distributor connected to the primary of the spark coil of the automobile. This is done by moving the connection 50 from the full line position to the dotted line position wherein it is connected through a lead 63 to the spark coil 64, while the opposite end of the primary of this coil is-connected through a lead 65 to the positive end of the automobile ignition battery 66, the negative end of which is grounded. The secondary of the spark coil is connected through a lead 67 to the metal scale 37. When contact is made so as to send a primary current through the spark coil it becomes energized, and on breaking this current a high potential voltage is generated in the secondary at the instant the contact points open and produces a spark which jumps from the metal scale 37 to the metal finger 39, and thence to ground. As a consequence a bright blue spark occurs and with the shaft 10 in rapid rotation these sparks occur so rapidly as to appear to the eye to be continuous at the same points each time on the scale. By turning the scale so that one of these points reads, say at zero, a spark should occur at each 45° interval around the scale. If this proves to be the case, the operator then knows that his points are properly adjusted. In Fig. 5 these points are marked by a small $x$ in a circle 68.

In Fig. 5 it will be observed that the angles of contact of the two arms do not overlap and there is an interval between of 11°. Thirty-four degrees (34°) angle of contact is sufficient to permit the coil to become thoroughly energized even at very high speeds. Should the angle of contact, however, drop below 26° on many cars insufficient time is allowed to permit the coil to become thoroughly energized, with the result that the spark produced is weak and faulty ignition results. Only a single spark coil is thus required for the engine, illustrated in Fig. 5.

In engines having more than eight cylinders, however, it becomes necessary to use two spark coils and to have their angles of contact overlapping. This is shown in Fig. 6 which illustrates the actual working conditions for a certain twelve cylinder engine having a distributor with a six lobe cam. The cylinders operating on one spark coil are shown by the shaded bands at the outside while those cylinders operating on the other spark coil are shown on the oppositely shaded bands at the inside. Having determined just what the angles are to be, these contact angles are then adjusted, as has been previously described, first in one contact arm, and then in the other, after which the contact arms are adjusted with respect to each other. In this case it is absolutely necessary that during the adjustment of one breaker the other be rendered inoperative, as by holding it out of engagement. If desired, the shaft 10 may be turned by hand while the adjustments and readings are made.

In Fig. 7 is illustrated in an enlarged view a pair of contacts 69 and 70, such as are ordinarily used on a distributor. A metal thickness gauge 71 which is usually .020" to .024" in thickness is used for setting these contacts. That is, the contacts are opened, the gauge 71 is inserted, and the movable contact is then set, so that it will just permit the gauge to pass through when the contact arm is riding on the nose of the cam. That is when the contacts are at their maximum distances apart. This assumes that the contacts are perfectly flat and have no protuberances whatever. Fig. 7, however, illustrates the fallacy of this method of the setting to contacts. In this case the contact 70 has a depression into which a hump 69$^a$ of the contact 69 fits. As a result the actual opening is not measured by the thickness of the gauge 71, but by the thickness of this gauge, plus the height of the hump 69$^a$. The result of such a setting would be to greatly decrease the contact angle with the result that insufficient time is allowed for energizing the spark coil, and a poor spark particularly at high speeds results.

Various defects of the distributor show up clearly with this device. Figure 8 shows the flashes as they appear when one breaker arm is bouncing. Thus B$^{10}$ shows clearly and sharply the flashes of the neon tube corresponding to the correct closure of the breaker when the breaker arm is lifted by two succeeding cam lobes. The flash A$^{10}$ has a gap 72 clearly visible which indicates that the breaker arm bounced off the cam once, and on returning rode the cam lobe for the remainder of the normal contact. The flash A'' shows two bounces due to the breaker arm bouncing off the contact after engagement, indicated by breaks 73 and 74. At high speed the flashes show breaks that are often much worse than these. Such breaks due to opening the contacts cause the induction coil to discharge, and it does not again have time to build up magnetization, so that the ensuing spark at 75 is weak and poor ignition, or none at all, results.

This bouncing may be due to several causes. Where there is a weak spring on the breaker arm and with the distributor shaft running at high speed, the cam follower on the breaker arm may not accurately follow the back of the cam lobe, but instead keeps away from it, thereby causing the flash of Fig. 8 to be shortened at the leading end causing the time of closing of the breaker to be accordingly shortened. This is particularly undesirable, for the reason that it is most likely to occur at high speed where there is none too much time given for magnetization to build up in the coil with the contacts working properly.

Chatter of the distributor parts often occurs, particularly at those points where vibration in the engine occurs, and this will manifest itself in the flashes of the neon tube.

With the distributor which has been in use for sometime the lobes of the cam may become badly worn, with the result that the contact angle may be entirely too long. This is particularly true with, say an eight cylinder engine operating off a single spark coil, as is shown in Fig. 5. When the angle becomes too long one of the distributor arms may fail to lift before the other arm closes on some of the cam lobes, with the result that no spark at all will occur for one or more cylinders. By observing a defective distributor of this kind with this neon tube device it will be seen that as the angle of contact of one of the arms is gradually increased, one after another of the cylinders will fail to receive its spark for the above reason.

This device also provides an excellent means of examining the contour of the cam. For this purpose it is well to place a piece of cardboard, or the like, under one of the contact arms while the other is being examined. By operating the device in the usual way and manipulating the adjusting screws 57 or 58, the length of the flashes can be controlled as well, and by comparing the four flashes (in case of an eight cylinder car) with each other, as by noting the angles of their opening and closing for various settings of these adjusting screws, one is enabled to get a very good picture of just what each cam lobe is like and any defects therein will show up greatly magnified.

Unnecessary looseness in the distributor shaft bearings also shows up in the neon flashes. Thus if one of the breaker arm springs is stiffer than the other it will tend to force the shaft over toward the other breaker arm, thereby lengthening the contact angle on the side of the breaker arm having the stiffer spring, and shortening the angle of contact on the side of the arm having the weaker spring. This fault, when not too bad, can be corrected by proper adjustments of the screws 57, 58. This effect can be produced as well by pressing a block of wood against the revolving distributor shaft so as to force it toward one or the other of the breaker arms. The effect can then be seen by the above described change of the length in the neon flashes produced by the two arms, one being lengthened, while the other is shortened.

Leakage of current through the insulated parts of the distributor can also be detected. It shows up as a very weak flash between the normally bright flashes where no flash whatever should appear.

This device is also useful for checking the governor control automatic spark advance for various speeds owing to the fact that connection is made to the distributor shaft. To do this the distributor is examined at a low speed and the opening point of one of the breakers is set on the dial at a definite point, say zero. The driving motor is then speeded up and the amount of automatic advance noted for different speeds. These advances can then be compared with tables showing the amounts of the automatic advance for the particular distributor under test for different engine speeds.

The herein described method of accurately setting the contact angle, however, entirely obviates all such errors, and enables the operator to see visually what his actual angle of contact is under the actual working conditions of the distributor.

To assist the operator to visualize exactly how the flashes should appear, I have provided a series of prints showing graduated dials with the flashes thereon similar to those of Figs. 5 and 6. This series includes the principal distributor and cylinder arrangements now in common use. In some instances, the spark distribution is not uniform, and this fact must be taken into account in setting the breaker points.

This is an improvement on prior test mechanism such as my Reissue Patent No. 18,596, in which a vibrating coil sends intermittent charges through the breaker points when closed and indicates these intermittent impulses by means of a neon tube. This lacks many features of the present invention, such as the continuous actuation, and the ability of this tester to operate continuously, whereas my prior invention could operate only while the engine was decelerating with the power shut off. The instantaneous and continuous illumination of the neon tube make accurate readings of the contact angle possible at high speeds where it is not possible with an interrupted impulse.

The term "neon tube" as used in this specification and claims is intended to include generally all gaseous discharge tubes which glow instantly on actuation by a suitable electric impulse, and the terms "continuous glow", "continuous bright band", "continuous bright arc", etc., as used in the claims, mean a glow which appears continuous to the observer's eyes. It will also be apparent from the foregoing that it is not necessary that the glow shall cover the entire scale of 360°. A 90° of arc would be sufficient inasmuch as this can be readily shifted to cover any part of the complete circle so that the whole scale could thus be examined.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, and means operably connected with said breaker points and cooperating with the indicator for continuously visually indicating on the graduated dial the angle of closure of the breaker points while the distributor shaft and indicator are in rotation.

2. A distributor tester for automobile ignition systems having cam-operated breaker points, said tester comprising means for rotating the shaft of the distributor under test, a graduated dial, an indicator means mounted for rotation with respect to said graduated dial, means connecting said indicator for rotation with the distributor shaft, said indicator means including a low voltage neon tube, and direct current means connecting the tube in series with the breaker points for continuously energizing the neon tube while the breaker points are closed for indicating on the graduated dial the angle of closure of the breaker points while the distributor shaft and indicator are in rotation.

3. A distributor tester for automobile ignition systems having cam-operated breaker points, said tester comprising means for rotating the shaft of the distributor under test, a graduated dial, an indicator means mounted for rotation with respect to said graduated dial, means connecting said indicator for rotation with the distributor shaft, said indicator means including a neon tube, means for producing in the neon tube a continuous glow when the breaker points are closed for indicating on the graduated dial the angle of closure of the breaker points while the distributor shaft and indicator are in rotation, and means for angularly adjusting the dial with respect to the indicator.

4. A tester for automobile distributors having a governor, said tester comprising a clamp for holding a distributor body, means for gripping the lower end of the distributor shaft, means for driving said shaft, a graduated dial, an indicator operable over said dial and operably connected to the driving means, said indicator having means including a gaseous discharge tube connected in series circuit with the breaker points and a source of current and operable during rotation of said indicator and said distributor shaft for continuously indicating on the dial the angles of opening and closing the breaker points whereby the action of the governor may be observed.

5. A distributor tester for automobile ignition systems having cam-operated breaker points, said tester comprising means for rotating the shaft of the distributor under test, a graduated dial, an indicator means mounted for rotation with respect to said graduated dial, means connecting said indicator for rotation with the distributor shaft, said indicator means including a neon tube, a well in which the indicator rotates, and a source of direct current electricity connected in series with the neon tube and the breaker points for producing in the neon tube a continuous glow for indicating on the graduated dial the angle of closure of the breaker points during rotation of the distributor shaft and indicator.

6. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, gaseous discharge means carried by the indicator for indicating on the graduated dial the angle of closure of the breaker points during rotation of the indicator and distributor shaft, and a source of current connecting said gaseous discharge means and breaker points in series, the make and break mechanism being exposed so that as adjustment is made of the angle of contact the actual angle of contact is simultaneously shown by the indicator.

7. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, a neon tube carried by the indicator, and means for energizing the neon tube while the breaker points are closed for indicating on the graduated dial the angle of closure of the breaker points during rotation of said indicator and distributor shaft, the make and break mechanism being exposed so that as adjustment is made of the angle of contact the actual angle of contact is simultaneously shown by the indicator.

8. A distributor tester for automobile ignition systems including a distributor having cam-operated breaker points, said tester comprising a shaft, means for rotating the shaft, a graduated scale, an indicator carried by the shaft and movable over said graduated scale, means adjacent said shaft for holding the body of a distributor to be tested while the make and break mechanism is open for adjustment, means connecting said shaft to the distributor shaft so that the two shafts turn in unison, and said indicator having light band producing means including a gaseous discharge tube connected in series circuit with said breaker points and operable by the rotation of said indicator and distributor shaft for showing on the graduated scale the angle of contact of the breaker points while adjustments are being made.

9. A distributor tester for automobile ignition systems including a distributor having cam-operated breaker points, said tester comprising a shaft, means for rotating the shaft, a graduated scale, an indicator carried by the shaft and movable over said graduated scale, means adjacent said shaft for holding the body of a distributor to be tested while the make and break mechanism is open for adjustment, means connecting said shaft to the distributor shaft so that the two shafts turn in unison, said indicator having light producing means including a gaseous discharge tube connected in series circuit with said breaker points and operable by the rotation of said indicator and distributor shaft for showing on the graduated scale the angle of contact of the breaker points while adjustments are being made, and means rotatably mounting the graduated scale with respect to the first mentioned shaft.

10. In mechanism for testing and setting the breaker points of automobile distributors, means for holding the distributor body when removed from the automobile so that the breaker points are accessible for adjustment, means for rotating the distributor shaft, a light band producing means connected to the distributor shaft for rotation therewith and including a gaseous discharge tube, a scale, and means connecting said tube to the breaker points for indicating the angle of contact of the breaker points on said scale while the distributor shaft is in rotation.

11. In mechanism for testing and setting the breaker points of automobile distributors, means for holding the distributor body when removed from the automobile so that the breaker points are accessible for adjustment, means for rotating the distributor shaft, a light band producing means connected to the distributor shaft for rotation therewith and including a gaseous discharge tube and a graduated scale, means mounting the scale concentric with the distributor shaft, and means connecting said tube to the breaker points and a source of current for indicating on the graduated scale the angle of contact of the breaker points while the distributor shaft is in rotation.

12. In means for setting the breaker points in an automobile distributor having a shaft, an indicator including a gaseous discharge tube, means for rotating the distributor shaft and indicator in synchronism, a scale adjacent which the indicator moves, means connected to the breaker points and tube for actuating the indicator to visually indicate the angle of closure of the breaker points on the scale, all while the make and break mechanism is under adjustment so that changes of adjustment are instantly shown on the scale.

13. In means for setting the breaker points in an automobile distributor having a shaft, a rotatable indicator comprising a radially slotted member and including a neon tube, means for rotating the distributor shaft and indicator in synchronism, a scale adjacent which the indicator moves, means connected to the breaker points and neon tube for actuating the neon tube to visually indicate through the slot of said member the angle of closure of the breaker points on the scale, all while the make and break mechanism is under adjustment so that changes of adjustment are instantly shown on the scale.

14. A distributor tester for automobile ignition systems having cam-operated breaker points and a distributor shaft for operating the cam, said tester comprising an indicator, a graduated dial surrounding the indicator, said indicator including a gaseous discharge tube, means for rotating the indicator in synchronism with the distributor shaft, and a direct current supply in series circuit with the breaker points and the gaseous discharge tube, whereby the gaseous discharge tube will indicate by a continuous bright band on the scale the angle of contact of the breaker points.

15. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, and a light emitting gaseous discharge tube connected with said breaker points and a source of current and cooperating with the indicator for continuously visually indicating on the graduated dial the angle of closure of the breaker points while the distributor shaft and indicator are in rotation.

16. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, a well in which the indicator rotates, and a light emitting gaseous tube discharge connected with said breaker points and a source of current and cooperating with the indicator for continuously visually indicating on the graduated dial the angle of closure of the breaker points while the distributor shaft and indicator are in rotation.

17. A distributor tester for automobile ignition systems having cam-operated breaker points, said tester comprising means for rotating the shaft of the distributor under test, a graduated dial, an indicator mounted for rotation with respect to said graduated dial, means connecting said indicator for rotation with the distributor shaft, and means operable by current flowing through the breaker points for producing a continuous illuminated arc adjacent the graduated scale as the indicator rotates, the arc corresponding in length and position to the angle during which the breaker points are in contact.

18. A distributor tester for automobile ignition systems having cam-operated breaker points, said tester comprising means for rotating the shaft of the distributor under test, a graduated dial, an indicator means mounted for rotation with respect to said graduated dial, means connecting said indicator for rotation with the distributor shaft, said indicator means including a low voltage neon tube, and direct current means for continuously energizing the neon tube while the breaker points are closed, the indicator having a radial slot above the neon tube for producing a continuous bright arc for indicating on the graduated dial the angle of closure of the breaker points while the distributor shaft and indicator are in rotation.

BUTLER J. HASKINS.